United States Patent Office 3,758,402
Patented Sept. 11, 1973

3,758,402
CATALYTIC HYDROCRACKING OF HYDROCARBONS
Stephen M. Oleck, Moorestown, N.J., Albert B. Schwartz, Philadelphia, Pa., and William A. Stover, Woodbury, N.J., assignors to Mobil Oil Corporation
No Drawing. Filed Oct. 6, 1970, Ser. No. 78,572
Int. Cl. C10g 11/02, 11/04
U.S. Cl. 208—111                    14 Claims

ABSTRACT OF THE DISCLOSURE

Hydrocarbons are hydrocracked to products boiling in the motor fuel range by using a catalyst mixture comprising hydrogenation components, a large pore size zeolite such as zeolite X or Y and a smaller pore size zeolite of the ZSM-5 type. In a preferred embodiment, a siliceous matrix material is also used. The use of the ZSM-5 type zeolite results in obtaining a fuel having an increased octane number.

BACKGROUND OF THE INVENTION (1) Field of the invention

This invention relates to a novel catalytic hydrocracking process to produce motor fuels involving the use of a catalyst mixture comprising two crystalline aluminosilicate zeolites—one zeolite can be stated to have general activity for cracking of the several types of hydrocarbons found in commercial gas oil, whereas the ZSM-5 type zeolite exercises a selective cracking function on only certain portions of the feed; the catalyst also comprises a hydrogenation component.

(2) Description of the prior art

Hydrocarbon conversion processes utilizing crystalline zeolites and, in particular, crystalline aluminosilicate catalysts have been the subject of expensive investigation during recent years as is obvious from both the patent and scientific literature. Crystalline aluminosilicates have been found to be particularly effective for a wide variety of hydrocarbon conversion processes including the catalytic hydrocracking of a gas oil to produce motor fuels and have been described and claimed in many patents including U.S. Pats. 3,140,249; 3,140,251; 3,140,252; 3,140,253; and 3,271,418. It is also known in the prior art to incorporate the crystalline aluminosilicate zeolite into a matrix for catalytic hydrocracking and such disclosure appears in one or more of the above-identified United States patents.

It is also known that improved results will be obtained with regard to the catalytic hydrocracking of gas oils if an aluminosilicate having a pore size of about 5 Angstrom units is included with the large pore size aluminosilicate either with or without a matrix. A disclosure of this type is found in copending application Ser. No. 548,376, filed May 9, 1966.

Although the incorporation of a crystalline aluminosilicate having a pore size of about 5 Angstrom units into a catalyst composite comprising a large pore size aluminosilicate has indeed been very effective with respect to the raising of octane number, nevertheless, the use of the instant composite results in even higher octane number. As can well be appreciated with regard to the present emphasis on environmental control and, in particular, air pollution, it is extremely desirable to obtain a process which will provide higher octane number gasolines so as to minimize the amount of lead which is usually added if it is desired to raise the octane number of the gasoline to a still higher level.

DESCRIPTION OF THE INVENTION

It has now been discovered that improved results can be obtained in the catalytic hydrocracking of gas oil with respect to octane number if the gas oil is hydrocracked utilizing a catalyst composition comprising a large pore size crystalline aluminosilicate in admixture with a novel shape selective crystalline aluminosilicate generally identified as the ZSM-5 type—said composition also containing a hydrogenation/dehydrogenation component.

Before the discovery of the ZSM-5 type zeolites all the crystalline aluminosilicates heretofore employed in prior art conversion processes fell into one of two general types. They either had pore sizes of about 5 angstrom units or had pore sizes of from about 6 to about 15 angstrom units. The 5 angstrom unit aluminosilicates were generally stated to be shape selective in that they allowed selective conversion of normal aliphatic compounds from a mixture of the same with iso-aliphatic compounds and cyclic compounds. The second type of aluminosilicate, i.e. those generally stated as having a pore size of 6 to 15 angstrom units will admit both normal and iso-aliphatic compounds. Thus, a very convenient method of identifying a good shape selective catalyst was to show that it would selectively sorb hexane from a mixture of the same with 2-methyl pentane since the former compound was able to enter its internal pore structure, whereas the latter iso-compound was unable to do so.

The ZSM-5 type zeolites which are used in combination with the large pore zeolites in the novel hydrocracking process of this invention can generally be stated to be intermediate between the two types of aluminosilicates previously described. Thus, the ZSM-5 type catalysts used in the novel process of this invention will allow the entry into their internal pore structure of normal aliphatic compounds and slightly branched aliphatic compounds, particularly monomethyl substituted compounds, yet substantially exclude all compounds containing at least a quaternary carbon atom or having a molecular dimension equal to or substantially greater than a quaternary carbon atom. Additionally, aromatic compounds having side chains similar to the normal aliphatic compounds and slightly branched aliphatic compounds above described could have side chains enter the internal pore structure of the instant catalysts. Thus, if one were to measure the selectivity of the ZSM-5 type materials employed in the process of this invention by the heretofore mentioned prior art test, i.e., the ability to selectively sorb hexane from a mixture of the same with isohexane, these catalysts would have to be stated as being non-shape selective. It should be immediately apparent, however, that the term selectivity has a far greater significance than merely the ability to preferentially distinguish between normal paraffins and isoparaffins. Selectivity on shape is theoretically possible at any shape or size although, quite obviously, such selectivity might not result in an advantageous catalyst for any and all hydrocarbon conversion processes.

While not wishing to be bound by any theory of operation nevertheless, it appears that the crystalline zeolitic materials of the ZSM–5 type employed in the instant invention cannot simply be characterized by the recitation of a pore size or a range of pore sizes. It would appear that the uniform pore openings of this new type of zeolite are not approximately circular in nature, as is usually the case in the heretofore employed zeolites, but rather, are approximately elliptical in nature. Thus, the pore openings of the instant zeolitic materials have both a major and a minor axis, and it is for this reason that the unusual and novel molecular sieving effects are achieved. This elliptical shape can be referred to as a "keyhole." It would appear that the minor axis of the elliptical pores in the zeolites apparently have an effective size of about 5.5 angstrom units. The major axis appears to be somewhere between 6 and about 9 angstrom units. The unique keyhole molecular sieving action of these materials is presumably due to the presence of these approximately elliptically shaped windows controlling access to the internal crystalline pore structure.

A test method has been devised in order to determine whether or not a zeolite possess the unique molecular sieving properties necessary to be combined with a large pore zeolite in order to carry out the novel conversion process of this invention. In said test method a candidate zeolite free from any matrix or binder is initially converted to the so-called acid or hydrogen form. This procedure involves exhaustive exchange with an ammonium chloride solution in order to replace substantially all metallic cations originally present. The sample is then dried, sized to 20–30 mesh and calcined in air for 16 hours at 550° C. One gram of the so-treated zeolite is then contacted with benzene at a pressure of twelve torr at a temperature of 25° C. for a time period of two hours. Another gram sample is contacted with mesitylene at a pressure of 0.5 torr at a temperature of 25° C. for a period of six hours. A preferred zeolite is one whose acid form will adsorb at least 3.0 weight percent benzene and less than 1.5 weight percent mesitylene at the above-recited conditions.

Examples of zeolitic materials which are operable in the process of this invention are ZSM–5 type which family includes not only ZSM–5 but also ZSM–8 zeolites. ZSM–5 type materials are disclosed and claimed in copending application Ser. No. 865,472, filed Oct. 10, 1969, and ZSM–8 is disclosed and claimed in copending application Ser. No. 865,418 filed Oct. 10, 1969.

The family of ZSM–5 compositions has the characteristic X-ray diffraction pattern set forth in Table 1, hereinbelow ZSM–5 compositions can also be identified, in terms of mole ratios of oxides, as follows:

$$0.9 \pm 0.2 M_{2/n}O : W_2O_3 : 5\text{--}100 YO_2 : zH_2O$$

wherein M is a cation, $n$ is the valence of said cation, W is selected from the group consisting of aluminum and gallium, Y is selected from the group consisting of silicon and germanium, and $z$ is from 0 to 40. In a preferred synthesized form, the zeolite has a formula, in terms of mole ratios of oxides, as follows:

$$0.9 \pm 0.2 M_{2/n}O : Al_2O_3 : 5\text{--}100 SiO_2 : zH_2O$$

and M is selected from the group consisting of a mixture of alkali metal cations, especially sodium, and tetraalkylammonium cations, the alkyl groups of which preferably contain 2–5 carbon atoms.

In a preferred embodiment of ZSM–5, W is aluminum, Y is silicon and the silica/alumina mole ratio is at least 10 and ranges up to about 60.

Members of the family of ZSM–5 zeolites possess a definite distinguishing crystalline structure whose X-ray diffraction pattern shows the following significant lines:

TABLE 1

| Interplanar spacing $d(A)$: | Relative intensity |
| --- | --- |
| 11.1±0.2 | S |
| 10.0±0.2 | S |
| 7.4±0.15 | W |
| 7.1±0.15 | W |
| 6.3±0.1 | W |
| 6.04±0.1 | W |
| 5.97±0.1 | W |
| 5.56±0.1 | W |
| 5.01±0.1 | W |
| 4.60±0.08 | W |
| 4.25±0.08 | W |
| 3.85±0.07 | VS |
| 3.71±0.05 | S |
| 3.64±0.05 | M |
| 3.04±0.03 | W |
| 2.99±0.02 | W |
| 2.94±0.02 | W |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, $100 I/I_0$, where $I_0$ is the intensity of the strongest line or peak, and $d$ (obs.), the interplanar spacing in A, corresponding to the recorded lines, were calculated. In Table 1 the relative intensities are given in terms of the symbols S=strong, M=medium, MS=medium strong, MW=medium weak and VS=very strong. It should be understood that this X-ray diffraction pattern is characteristic of all the species of ZSM–5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM–5 have been prepared. X-ray powder diffraction patterns of several of these forms are set forth below. The ZSM–5 forms set forth below are all aluminosilicates.

TABLE 2

X-ray diffraction ZSM-5 powder in cation exchanged forms $d$ spacings observed

| As made | HCl | NaCl | CaCl₂ | RECl₃ | AgNO |
| --- | --- | --- | --- | --- | --- |
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
|  |  | 9.01 | 9.04 |  | 8.99 |
| 8.06 |  |  |  |  |  |
| 7.44 | 7.46 | 7.46 | 7.46 | 7.40 | 4.46 |
| 7.08 | 7.07 | 7.09 | 7.11 |  | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 |  | 5.38 | 5.37 | 5.38 | 5.37 |
| 5.13 | 5.11 | 5.14 | 5.12 | 5.14 |  |
| 4.99 | 5.01 | 5.01 | 5.01 | 5.01 | 5.01 |
|  |  | 4.74 |  |  |  |
| 4.61 | 4.62 | 4.62 | 4.61 | 4.63 | 4.62 |
|  |  | 4.46 | 4.46 |  | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 |  | 4.09 | 4.09 | 4.09 | 4.09 |
| 4.00 | 4.01 | 4.01 | 4.00 | 4.01 | 4.09 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
|  | 3.60 | 3.60 | 3.60 | 3.61 | 3.60 |
| 3.40 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |

TABLE 2—Continued

| As made | HCl | NaCl | CaCl₂ | RECl₃ | AgNO |
|---|---|---|---|---|---|
| 3.25 | 3.25 | 3.26 | 3.25 | 3.25 | 3.26 |
| 3.17 | | | 3.17 | 3.18 | |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| | | | | 2.97 | |
| | 2.95 | 2.95 | 2.94 | 2.95 | 2.95 |
| 2.86 | 2.87 | 2.87 | 2.87 | 2.87 | 2.87 |
| 2.80 | | | | | |
| 2.87 | | | 2.78 | | 2.78 |
| 2.73 | 2.74 | 2.74 | 2.73 | 2.74 | 2.74 |
| 2.67 | | | 2.68 | | |
| 2.66 | | | 2.65 | | |
| 2.60 | 2.61 | 2.61 | 2.61 | 2.61 | 2.61 |
| | 2.59 | | 2.59 | | |
| 2.57 | | 2.57 | 2.56 | | 2.57 |
| 2.50 | 2.52 | 2.52 | 2.52 | 2.52 | |
| 2.49 | 2.49 | 2.49 | 2.49 | 2.49 | 2.49 |
| | | | 2.45 | | |
| 2.41 | 2.42 | 2.42 | 2.42 | 2.42 | |
| 2.39 | 2.40 | 2.40 | 2.39 | 2.40 | 2.40 |
| | | | 2.38 | 2.35 | 2.33 |
| | 2.33 | | 2.33 | 2.32 | 2.33 |
| | 2.30 | | | | |
| | 2.24 | 2.23 | 2.23 | | |
| | 2.20 | 2.21 | 2.20 | 2.20 | |
| | 2.18 | 2.18 | | | |
| | | 2.17 | 2.17 | | |
| | 2.13 | | 2.13 | | |
| | 2.11 | 2.11 | | 2.11 | |
| | | | 2.10 | 2.10 | |
| | 2.08 | 2.08 | | 2.08 | 2.08 |
| | | 2.07 | 2.07 | | |
| | | | 2.04 | | |
| 2.01 | 2.01 | 2.01 | 2.01 | 2.01 | 2.01 |
| 1.99 | 2.00 | 1.99 | 1.99 | 1.99 | 1.99 |
| | | | 1.97 | 1.96 | |
| 1.95 | 1.95 | 1.95 | 1.95 | 1.95 | |
| | | | | 1.94 | |
| | 1.92 | 1.92 | 1.92 | 1.92 | 1.92 |
| 1.91 | | | | 1.91 | |
| | | | | 1.88 | |
| 1.87 | 1.87 | 1.87 | 1.87 | 1.87 | 1.87 |
| | 1.86 | | | | |
| 1.84 | 1.84 | | | 1.84 | 1.84 |
| 1.83 | 1.83 | 1.83 | 1.83 | 1.83 | |
| 1.82 | | 1.81 | | 1.82 | |
| 1.77 | 1.77 | 1.79 | 1.78 | | 1.77 |
| 1.76 | 1.76 | 1.76 | 1.76 | 1.76 | 1.76 |
| | | 1.75 | | | 1.75 |
| | 1.74 | 1.74 | 1.73 | | |
| 1.71 | 1.72 | 1.72 | 1.71 | | 1.70 |
| 1.67 | 1.67 | 1.67 | | 1.67 | 1.67 |
| 1.66 | 1.66 | | 1.66 | 1.66 | 1.66 |
| | | 1.65 | 1.65 | | |
| | | 1.65 | 1.64 | | |
| | 1.63 | 1.63 | 1.63 | 1.63 | 1.62 |
| | 1.61 | 1.61 | 1.61 | | 1.61 |
| 1.58 | | | | | |
| | 1.57 | 1.57 | | 1.57 | 1.57 |
| | | 1.56 | 1.56 | 1.56 | |

Zeolite ZSM-5 can be suitably prepared by preparing a solution containing tetrapropyl ammonium hydroxide, sodium oxide, an oxide of aluminum or gallium, an oxide of silica and water and having a composition, in terms of mole ratios of oxides, falling within the following ranges:

TABLE 3

| | Broad | Preferred | Particularly preferred |
|---|---|---|---|
| OH⁻/SiO₂ | 0.07–1.0 | 0.1–0.8 | 0.2–0.75 |
| R₄N+/(R₄N+ +Na+) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum and Y is silicon maintaining the mixture until crystals of the zeolite are formed. Thereafter the crystals are separated from the liquid and recovered. Typical reaction conditions consist of heating the foregoing reaction mixture to a temperature of from about 75° C. to 175° C. for a period of time of from about six hours to 60 days. A more preferred temperature range is from about 90 to 150° C. with the amount of time at a temperature in such range being from about 12 hours to 20 days.

The digestion of the gel particles is carried out until crystals form. The solid product is separated from the reaction medium, as by cooling the whole to room temperature, filtering, and water washing.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be uderstood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can also be identified, in terms of mole ratios of oxides, as follows:

$$0.9\pm0.2M_{2/n}O:Al_2O_3:5-100SiO_2:zH_2O$$

wherein M is at least one cation, n is the valence thereof and z is from 0 to 40. In a preferred synthesized form, the zeolite has a formula, in terms of mole ratios of oxides, as follows:

$$0.9\pm0.2M_{2/n}O:Al_2O_3:10-60SiO_2:zH_2O$$

and M is selected from the group consisting of a mixture of alkali metal cations, especially sodium, and tetraethylammonium cation.

ZSM-8 possesses a definite distinguishing crystalline structure having the following X-ray diffraction pattern:

TABLE 4

| dA | I/I₀ | dA | I/I₀ | dA | I/I₀ | dA | I/Ir |
|---|---|---|---|---|---|---|---|
| 11.1 | 46 | 4.35 | 7 | 3.04 | 10 | 2.32 | 1 |
| 10.0 | 42 | 4.25 | 18 | 2.99 | 6 | 2.28 | 1 |
| 9.7 | 10 | 4.07 | 20 | 2.97 | 4 | 2.23 | 1 |
| 9.0 | 6 | 4.00 | 10 | 2.94 | 3 | 2.20 | 1 |
| 7.42 | 10 | 3.85 | 100 | 2.86 | 2 | 2.17 | 1 |
| 7.06 | 7 | 3.82 | 57 | 2.78 | 1 | 2.12 | 1 |
| 6.69 | 5 | 3.75 | 25 | 2.73 | 4 | 2.11 | 1 |
| 6.35 | 12 | 3.71 | 30 | 2.68 | 1 | 2.08 | 1 |
| 6.04 | 6 | 3.64 | 26 | 2.61 | 3 | 2.06 | 1 |
| 5.97 | 12 | 3.59 | 2 | 2.57 | 1 | 2.01 | 6 |
| 5.69 | 9 | 3.47 | 6 | 2.55 | 1 | 1.99 | 6 |
| 5.56 | 13 | 3.43 | 9 | 2.51 | 1 | 1.95 | 2 |
| 5.36 | 3 | 3.39 | 5 | 2.49 | 6 | 1.91 | 2 |
| 5.12 | 4 | 3.34 | 18 | 2.45 | 1 | 1.87 | 3 |
| 5.01 | 7 | 3.31 | 8 | 2.47 | 2 | 1.84 | 1 |
| 4.60 | 7 | 3.24 | 4 | 2.39 | 3 | 1.82 | 2 |
| 4.45 | 3 | 3.13 | 3 | 2.35 | 1 | | |

Zeolite ZSM-8 can be suitably prepared by reacting a solution containing either tetraethylammonium hydroxide or tetraethylammonium bromide together with sodium oxide, aluminum oxide, and an oxide of silica and water.

The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range SiO₂/Al₂O₃—from about 10 to about 200

Na₂O/tetraethylammonium hydroxide—from about 0.05 to 0.20

Tetraethylammonium hydroxide/SiO₂—from about 0.08 to 1.0

H₂O/tetraethylammonium hydroxide—from about 80 to about 200

Thereafter, the crystals are separated from the liquid and recovered. Typical reaction conditions consist of heating the foregoing reaction mixture to a temperature of from about 100° C. to 175° C. for a period of time of from about six hours to 60 days. A more preferred temperature range is from about 150 to 175° C. with the amount of time at a temperature in such range being from about 12 hours to 8 days.

The foregoing product is dried, e.g. at 230° F., for from about 8 to 24 hours. Of course, milder conditions may be employed if desired, e.g. room temperature under vacuum.

As has heretofore been stated, a zeolite of the ZSM-5 type above-described is used in conjunction with a large pore zeolite, i.e. one having a pore size greater than 7 angstrom units which has the ability to act upon substantially all the components usually found in a commercial gas oil. Large pore aluminosilicates of this type are well known and include natural and synthetic faujasite of both the X and Y type, as well as zeolite L. Of these materials, zeolite Y is particularly preferred.

Both the large pore zeolites and the ZSM-5 type zeolites used in the instant invention usually have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of ammonium, hydrogen, rare earth, $Mg^{++}$, $Zn^{++}$, $Mn^{++}$, $Al^{+++}$, $Ca^{++}$, and mixtures thereof.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. 3,140,249; 3,140,251; and 3,140,253.

Following contact with the salt solution of the desired replacing cation, the zeolites may be washed with water and dried at a temperature ranging from 150° F. to about 600° F. and thereafter heated in air or other inert gas at temperatures ranging from about 500° F. to 1500° F. for periods of time ranging from 0.1 to 48 hours or more.

As has heretofore been pointed out in one embodiment, the novel catalyst composites of this invention comprise a physical mixture of at least two different cracking components, one being an aluminosilicate having a pore size greater than about 7 angstrom units. In one embodiment, a mixture of catalyst particles is used in which each particle contains only one of the two types of zeolites. Thus, for example, a mixture of spray dried particles comprising ZSM-5 type crystals in a matrix and particles comprising faujasite crystals in a matrix may be composited in a hydrocracking catalyst. A hydrogenation/dehydrogenation component is present in both zeolites. Alternatively, the catalyst components may be pelleted, cast, molded, spray-dried, or otherwise formed into pieces of desired size and shape such as rods, spheres, pellets, etc.

A most preferred embodiment of this invention resides in the use of a porous matrix together with the two types of zeolites previously described. Therefore, the most preferred class of catalysts falling within the scope of this invention would include a system containing a hydrogenation/dehydrogenation component, an aluminosilicate of the ZSM-5 type, and an aluminosilicate having a pore size greater than 7 angstrom units which are combined, dispersed or otherwise intimately admixed with a porous matrix in such proportions that the resulting product contains from 1% to 95% by weight, and preferably from 10 to 50% by weight, of the total aluminosilicates in the final composite. It is to be understood that both aluminosilicates need not be mixed with the same matrix, but that separate matrices may be employed.

The term "porous matrix" includes inorganic compositions with which the aluminosilicates can be combined, dispersed, or otherwise intimately admixed wherein the matrix may be active or inactive. It is to be understood that the porosity of the compositions employed as a matrix can either by inherent in the particular material or it can be introduced by mechanical or chemical means. Representative matrices which can be employed include metals and alloys thereof, sintered metals and sintered glass, asbestos, silicon carbide, aggregates, pumice, firebrick, diatomaceous earths, and inorganic oxides. Inorganic compositions, especially those of a siliceous nature are preferred. Of these matrices, inorganic oxides such as clay, chemically treated clay, silica, silica-alumina, etc., are particularly preferred because of their superior porosity, and stability under reaction conditions, especially those reaction conditions encountered in the hydrocracking of gas oil.

The composition of the aluminosilicate with an inorganic oxide can be achieved by several methods wherein the aluminosilicates are reduced to a particle size less than 40 microns, preferably less than 10 microns, and intimately admixed with an inorganic oxide while the latter is in a hydrous state such as in the form of hydrosol, hydrogel, wet gelatinous precipitate, or in a dried state, or a mixture thereof. Thus, finely divided aluminosilicates can be mixed directly with a siliceous gel formed by hydrolyzing a basic solution of alkali metal silicate with an acid such as hydrochloric, sulfuric, acetic, etc. The mixing of the three components can be accomplished in any desired manner, such as in ball mill or other types of mills. The aluminosilicates also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Pat. 2,384,946. The aluminosilicate siliceous gel thus obtained is washed free of soluble salts and thereafter dried and/or calcined as desired.

In a like manner, the aluminosilicates may be incorporated with an aluminiferous oxide. Such gels and hydrous oxides are well known in the art and may be prepared, for example, by adding ammonium hydroxide, ammonium carbonate, etc. to a salt of aluminum, such aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel, or wet gelatinous precipitate or hydrous oxide, or in the dried state.

The catalytically inorganic oxide matrix may also consist of a plural gel comprising a predominant amount of silica with one or more metals or oxides thereof selected from Groups I-B, II, III, IV, V, VI, VII and VIII of the Periodic Table. Particular preference is given to plural gels or silica with metal oxides of Groups II-A, III and IV-A of the Periodic Table, especially wherein the metal oxide is rare earth oxide, magnesia, alumina, zirconia, titania, beryllia, thoria, or combinations thereof. The preparation of plural gels is well known and generally involves either separate precipitation or coprecipitation techniques, in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent.

The inorganic oxide may also consist of raw clay or a clay mineral which has been treated with an acid medium to render it active. The aluminosilicate can be incorporated into the clay simply by blending the two and fashioning the mixture into desired shapes. Suitable clays include attapulgite, kaolin, sepiolite, polygarskite, kaolinite, halloysite, plastic ball clays, bentonite, montmorillonite, illite, chlorite, etc.

Other useful matrices include powders of refractory oxides, such as alumina, etc. having very low internal pore volume. Preferably, these materials have substantially no inherent catalytic activity of their own.

The catalyst product can be heated in steam or in other atmospheres, e.g., air, near the temperature contemplated for conversion but may be heated to operating temperatures initially during use in the conversion process. Generally, the catalyst is dried between 150° F. and 600° F. and thereafter may be calcined in air, steam, nitrogen, helium, flue gas, hydrogen or other gases not harmful to the catalyst product at temperatures ranging from about 500° F. to 1600° F. for periods of time ranging from 1 to 48 hours or more. It is to be understood that the aluminosilicate can also be calcined prior to incorporation into the inorganic oxide gel. It is also to be understood that the aluminosilicate or aluminosilicates need not be ion exchanged prior to incorporation in a matrix but can be so treated during or after incorporation into the matrix.

The catalyst can be subjected to a mild steam treatment at elevated temperatures of 800° F. to 1600° F. and preferably at temperatures of about 1000° F. to 1500° F. if such is desired. The treatment may be accomplished in an atmosphere of 100% steam or in an atmosphere consisting of steam and air or a gas which is not harmful to the aluminosilicates or to the hydrogenation component. The steam treatment can be conducted before, after, or in place of the calcination treatment.

The particle size of each type of zeolite making up the catalyst system is not narrowly critical but should be less than 100 microns and particle sizes within the range of from less than 0.1 to 10 microns are preferred. It is also to be noted that each individual component in the catalyst system need not be of the same particle size.

The particular proportion of one component to the other in the catalyst is also not narrowly critical and can vary over an extremly wide range. However, it has been found that for most purposes the weight ratio of the ZSM-5 type aluminosilicate to the large pore size aluminosilicate can range from 1:10 up to 3:1 and preferably from 1:5 up to 2:1 and still more preferably 1:4 to 1:1.

The ZSM-5 type crystalline aluminosilicates and the crystalline aluminosilicates with pores greater than 7 angstroms may be added to a hydrocracking unit as a mixture of crystallites within the same particles of catalyst composite, whether the particles are beads, extrudates, or spray-dried microspheres. Alternatively, a mixture of particles may be added to the hydrocracking unit, some particles containing only the ZSM-5 type aluminosilicate crystallites and hydrogenation component and the other particles containing only the large pore aluminosilicate crystallites and hydrogenation component. In either case, the ratio of ZSM-5 type aluminosilicates to large pore aluminosilicates should be within the range of 1:10 to 3:1.

The amount of the hydrogenation/dehydrogenation component employed is not narrowly critical and can range from about 0.01 to about 30 weight percent based on the entire catalyst. A variety of hydrogenation components may be combined with either or both of the zeolites and/or matrix in any feasible manner which affords intimate contact of the components, employing well known techniques such as impregnation, coprecipitation, cogellation, mechanical admixture of one component with the other exchange and the like. The hydrogenation component can include metals, oxides, and sulfides of metals of the Periodic Table which fall in Group VI-B including chromium, molybdenum, tungsten and the like; Group II-B including zinc cadmium; and Group VIII including cobalt, nickel, platinum, palladium, rhenium, rhodium and the like and combinations of metals, sulfides and oxides of metals of Group VI-B and VIII, such as nickel-tungsten-sulfide, cobalt oxide-molybdenum oxide and the like.

The pre-treatment before use varies depending on the hydrogenation component present. For example, with components such as nickel-tungsten and cobalt molybdenum, the catalyst is sulfur activated. But with metals like platinum or palladium, a hydrogenation step is employed. These techniques are well known in the art and are accomplished in a conventional manner.

Within the above description of the aluminosilicates which can be physically admixed in a porous matrix to prepare the catalysts of this invention, it has been found that certain aluminosilicates provide superior results when employed in hydrocracking operations.

First of all, it is preferred that there be a limited amount of alkali metal cations associated with the aluminosilicates since the presence of alkali metals tends to suppress or limit catalytic properties, the activity of which as a general rule decreases with increasing content of alkali metal cations. Therefore, it is preferred that the aluminosilicates contain no more than 0.25 equivalents per gram atom of aluminum and more preferably no more than 0.15 equivalents per gram atom of aluminum of alkali metal cations.

With regard to the metal cations associated with the large pore aluminosilicate, the general order of preference is, first, cations of trivalent metals, followed by cations of divalent metals, with the least preferred being cations of monovalent metals. Of the trivalent metal cations, the most preferred are rare earth metal cations, either individually or as mixtures of rare earth metal cations.

Additionally, it is particularly preferred to have at least some protons or proton precursors associated with the aluminosilicate.

It is also preferred that both of the aluminosilicates have an atomic ratio of silicon to aluminum of at least 1.25 preferably 1.8 and even more desirable at least 2.0.

It is to be understood, however, that this invention includes the use of catalyst compositions wherein both aluminosilicates are of the same class, e.g. both metal aluminosilicates; of different casses, e.g. one metal and one acid aluminosilicate; in the same matrix or in different matrices, i.e., one aluminosilicate in silica-alumina and the other in silica-zirconia.

Hydrocarbon charge stocks undergoing hydrocracking in accordance with this invention comprise hydrocrackable hydrocarbons generally and, in particular, petroleum fractions having an initial boiling point of at least 400° F., a 50% point of at least 500° F., and an end point of at least 600° F. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

Hydrocracking in accordance with the present process is generally carried out at a temperature between between 400° F. and about 950° F. The hydrogen pressure in such operation is generally within the range of about 100 and about 3,000 p.s.i.g. and preferably about 350 to about 2,000 p.s.i.g. The liquid hourly space velocity, i.e., the liquid volume of hydrocarbon per hour per volume of catalyst is about 0.1 and about 10. In general the molar ratio of hydrogen to hydrocarbon charge employed is between about 2 and about 80, and preferably between about 5 and 50.

The process of this invention may be carried out in equipment suitable for catalytic operations. The process may be operated batchwise. It is preferable, however, and generally more feasible, to operate continuously. Accordingly, the process is adapted to operations using a fixed bed of catalyst. Also the process can be operated using a moving bed of catalyst wherein the hydrocarbon flow may be concurrent or countercurrent to the catalyst flow. A fluid type of operation may also be employed with the catalyst described herein. After hydrocracking the resulting products may suitably be separated from the remaining components by conventional means such as adsorption, distillation, etc. Also the catalyst, after use over an extended period of time, may be regenerated with hydrogen or in accordance with conventional procedures, by burning off carbonaceous deposits from the surface of the catalyst in an oxygen containing atmosphere under the conditions of elevated temperature.

Although the process of the invention has been described as having both the hydrocracking catalyst of generalized competence and the ZSM-5 type aluminosilicate in the same reaction zone, another embodiment of this invention resides in carrying out two separate hydrocracking operations, one with one component of the catalyst composition and one with the other component. Thus, the invention will include hydrocracking a feed stream with a cracking catalyst of generalized competence having hydrogenation/dehydrogenation activity and then rehydrocracking the reaction products obtained with an aluminosilicate of the ZSM-5 type which also has hydrogenation/dehydrogenation activity.

The high catalytic activity and selectivity of the catalyst system is illustrated by its ability to catalyze the conversion of gas oils to gasoline having an end point of about 385° F. The charge stock used for hydrocracking evaluation is an effluent stream from a first stage hydrotreating operation in a refinery using West Coast crudes.

EXAMPLE 1

This example will illustrate a hydrocracking operation with a catalyst composition comprising a large pore size aluminosilicate in a matrix. There is *no* ZSM-5 zeolite present.

The charge stock employed had the following properties:

| | |
|---|---|
| API gravity at 60° F. | 33.8 |
| Sulfur, p.p.m. | (163) |
| Nitrogen, p.p.m. | 0.2 |
| Hydrogen, percent wt. | 13.39 |
| Aniline No., ° F. | 142.9 |

ASTM distillation, vol. percent:

| | |
|---|---|
| IBP | 237 |
| 5% | 367 |
| 10% | 410 |
| 20% | 441 |
| 30% | 466 |
| 40% | 483 |
| 50% | 500 |
| 60% | 520 |
| 70% | 540 |
| 80% | 564 |
| 90% | 596 |
| E.P. | 660 |

The catalyst employed in this example was an equal part by weight mixture of a nickel-tungsten impregnated rare earth exchanged zeolite X and nickel-tungsten impregnated silica-alumina. This catalyst was charged to a hydrocracking test unit, treated for 16 hours at 250° F. in a 5% $H_2S$/95% $H_2$ gas stream and then used to hydrocrack the previously described charge stock at 1450 p.s.i.g., 1 LHSV and 6800 s.c.f. $H_2$/b. so as to obtain a 60 vol. percent conversion of charge.

EXAMPLE 2

The procedure of Example 1 was repeated with the sole exception that H-ZSM-5 was substituted for ⅕ by weight of the rare earth exchanged X.

The catalyst was prepared according to the following procedure:

(a) 300 grams (on an ignited basis) of silica-alumina (commercially available as Nalco low $Al_2O_3$ FCC catalyst) were impregnated with a 250 cc. solution containing 70.5 grams of nickel nitrate hexahydrate and 47.5 grams of ammonium metatungstate.

(b) In another vessel were charged 240 grams (on an ignited basis) of rare earth exchanged zeolite X containing 0.7 wt. percent sodium which had been calcined at 1300° F. for ∼¼ hours and 60 grams (on an ignited basis) of dried ammonium exchanged ZSM-5 containing 0.2 wt. percent sodium. The two zeolites were mixed and impregnated with 95 cc. of a solution containing 70.5 grams of nickel nitrate hexahydrate and 47.5 grams of ammonium metatungstate.

(a) and (b) were then mixed together and 135 grams of water and 4 grams of an extrusion aid (polyvinyl alcohol) were added. The mixture was then extruded to ³⁄₃₂" diameter pellets, dried at 250° F. and calcined in air for 3 hours at 1000° F.

This catalyst was charged to the same unit, treated 16 hours in 5% $H_2S$/95% $H_2$ gas stream at 250° F. and then evaluated for hydrocracking in the same manner as in Example 1. The results of said evaluation are shown in the following table.

TABLE

| Example | 1 | 2 |
|---|---|---|
| Conversion, vol. percent | 60 | 60 |
| Temperature, °F | 579 | 554 |
| Hydrogen consumption, s.c.f./b | 595 | 775 |
| Increase in octane number (R+3 ml. TEL) | | +4 |

From the above, it can be seen that the catalyst containing ZSM-5 (Example 2) was more active, i.e., +25° F., and resulted in a product having an octane number increase of +4.

EXAMPLES 3-8

The catalysts of Examples 1 and 2 were further evaluated for hydrocracking at different conversion levels.

The feed was the same as that of Example 1 and the operating conditions were as follows:

1450 p.s.i.g.
1 LHSV
6800 s.c.f./b. of $H_2$
30 cc. catalyst

The conversion levels employed and the results are shown in the following table, where A represents the catalyst of Example 1 (no ZSM-5) and B is the catalyst of Example 2.

TABLE

| Example: | Catalyst | Conversion, vol. percent | Octane number, R+3 ml. TEL |
|---|---|---|---|
| 3 | A | 32 | 86.2 |
| 4 | B | 35 | 89.0 |
| 5 | A | 57 | 88.4 |
| 6 | B | 59.5 | 94.5 |
| 7 | A | 65 | 87.5 |
| 8 | B | 66 | 91.0 |

From the above, it can be seen that the catalyst of this invention resulted in products of increased octane number over varying conversion levels.

What is claimed is:

1. In the catalytic hydrocracking of a hydrocarbon oil to produce hydrocarbons of lower boiling range, the improvement of contacting said oil under hydrocracking conditions with a catalyst composition comprising a mixture of (a) aluminosilicate crystalites of the ZSM-5 type having a composition in terms of mole ratios of oxides as follows:

$$0.9 \pm 0.2 M_{2/n}O : Al_2O_3 : YSiO_2 : zH_2O$$

wherein M is at least one cation having a valence $n$, Y is at least 5 and $z$ is between 0 and 40, said aluminosilicate having the X-ray diffraction lines as set forth in Table 1 of the specification; (b) an aluminosilicate crystallite having a pore size greater than 7 Angstrom units; and (c) a hydrogenation/dehydrogenation component in association with at least one of the aforementioned crystallites.

2. The method of claim 1 wherein at least one of the aluminosilicates has cations of polyvalent metals associated therewith.

3. The method of claim 1 wherein at least one of the aluminosilicates has protons associated therewith.

4. In the catalytic hydrocracking of a hydrocarbon oil to produce hydrocarbons of lower boiling range, the improvement of contacting said oil under hydrocracking conditions with a catalyst composition comprising discrete crystallites of (a) an aluminosilicate of the ZSM-5 type having a composition in terms of mole ratios of oxides as follows:

$$0.9 \pm 0.2 M_{2/n}O : Al_2O_3 : YSiO_2 : zH_2O$$

wherein M is at least one cation having a valence $n$, Y is at least 5 and $z$ is between 0 and 40, said aluminosilicate having the X-ray diffraction lines as set forth in Table 1 of the specification; (b) an aluminosilicate having a pore size greater than 7 Angstrom units embodied within particles comprising a porous matrix; and (c) a hydrogenation/dehydrogenation component in association with at least one of the crystallites.

5. The process of claim 4 wherein both types of aluminosilicate crystallites are within the same particle.

6. The process of claim 4 wherein each particle comprises only one type of aluminosilicate crystallites.

7. The process of claim 4 wherein the porous matrix comprises an inorganic oxide gel.

8. The process of claim 4 wherein the porous matrix is selected from silica, alumina, zirconia, clay, and combinations thereof.

9. The process of claim 4 wherein the porous matrix is extended with alumina.

10. The process of claim 4 in which the hydrogenation component is a mixture of nickel and tungsten oxides.

11. The process of claim 4 in which the hydrogenation component is a mixture of nickel and tungsten sulfides.

12. The process of claim 4 in which said catalyst composition has been sulfided by contacting the catalyst with a sulfur containing compound before said hydrocracking occurs.

13. The process of claim 4 in which the aluminosilicate having a pore size greater than 7 Angstrom units is synthetic faujasite.

14. The process of claim 4 in which the crystallites comprise (a) cationic forms of ZSM-5 type chosen from the group consisting of hydrogen, polyvalent metals and mixtures thereof, and (b) synthetic rare earth faujasite.

References Cited

UNITED STATES PATENTS

| | | | |
|---|---|---|---|
| 3,438,887 | 4/1969 | Morris et al. | 208—111 X |
| 3,494,854 | 2/1970 | Gallagher et al. | 208—111 X |
| 3,539,498 | 11/1970 | Morris et al. | 208—111 |
| 3,620,963 | 11/1971 | Mulaskey | 208—111 |
| 3,650,945 | 3/1972 | Bertolacini et al. | 208—111 |
| 3,385,781 | 5/1968 | Hamner et al. | 208—111 X |
| 3,267,022 | 8/1966 | Hansford | 208—111 |
| 3,324,047 | 6/1967 | Hansford | 208—120 X |
| 3,312,615 | 4/1967 | Cramer et al. | 208—111 X |
| 3,317,767 | 7/1967 | Arey et al. | 208—111 |
| 3,344,058 | 9/1967 | Miale | 208—111 |

DANIEL E. WYMAN, Primary Examiner

P. F. SHAVER, Assistant Examiner

U.S. Cl. X.R.

208—120; 252—455.2